Patented May 11, 1954

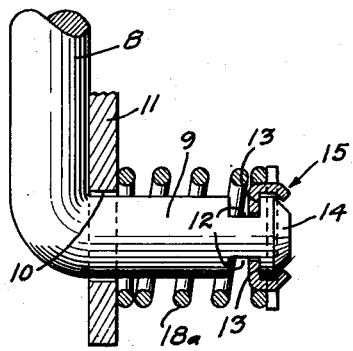
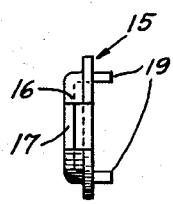
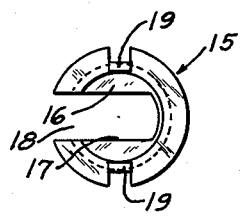
FIG.1.   FIG.2.   FIG.3.
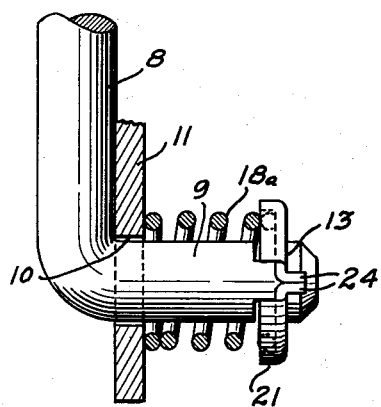
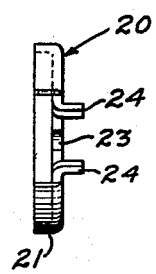
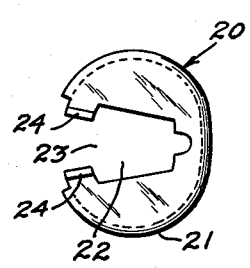
FIG.4.   FIG.5.   FIG.6.
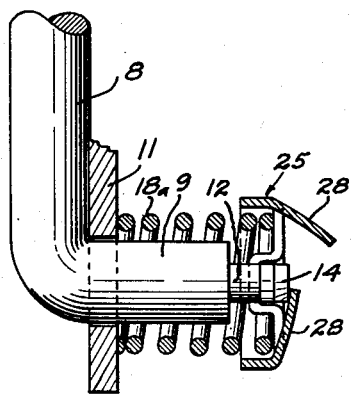
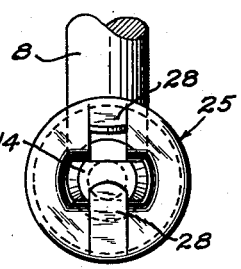
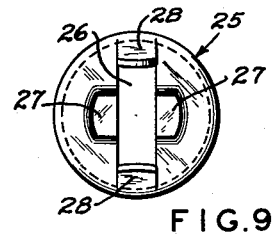
FIG.7.   FIG.8.   FIG.9.
INVENTOR.
EDWARD W. NIEMEYER
HAROLD A. CARLSON
BY George R. Ericson
ATTORNEY

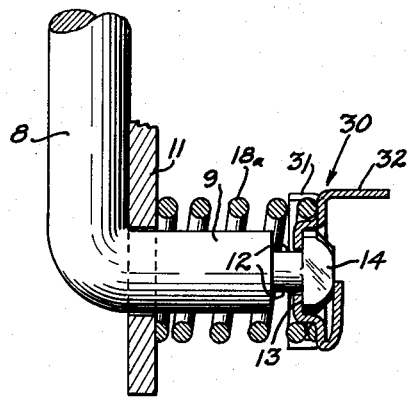
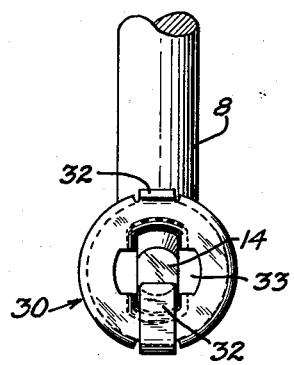
FIG.10.  FIG.11.
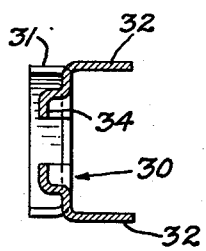
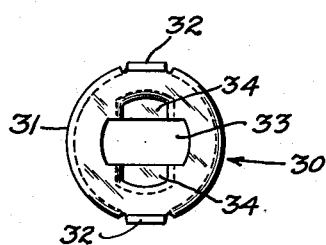
FIG.12.  FIG.13.
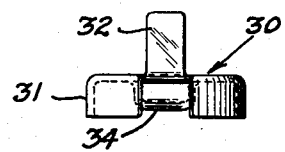
FIG.14.
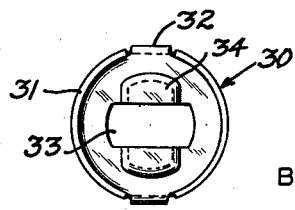
FIG.15.
*INVENTOR.*
EDWARD W. NIEMEYER
HAROLD A. CARLSON
BY
ATTORNEY

2,678,227

UNITED STATES PATENT OFFICE 2,678,227

ANTIRATTLE FASTENER DEVICE

Edward W. Niemeyer, Normandy, and Harold A. Carlson, Brentwood, Mo., assignors to Carter Carburetor Corporation, St. Louis, Mo., a corporation of Delaware Application March 26, 1951, Serial No. 217,448

2 Claims. (Cl. 287—93)

This application is a continuation-in-part of our abandoned copending application Serial No. 621,144, filed October 8, 1945, and relates to anti-rattle devices and consists particularly in novel means for preventing disassembly of such a device under the influence of vibration.

Where a pair of connected members, such as a shaft, stud, bolt, or link and a wall or lever, are subject to vibration, and it is not feasible to provide an accurate bearing therebetween, there is a substantial problem in preventing rattling and rapid wear between the members. This problem has been partially solved by providing a compression spring between one of the members and a fastener collar seated on the other which yieldingly maintains the members in fixed relative positions. However, such a device, where applied to an automotive carburetor, for instance, must be readily removable in the field and, consequently, there is a danger of the device becoming disassembled because of vibration, causing the spring collar to slip from its assembled position.

It is an object of the present invention to provide an anti-rattle fastener device which cannot be disassembled as a result of vibration, but yet which is subject to a relatively simple manual operation to remove the parts.

This object and other more detailed objects hereafter appearing are attained by the device illustrated in the accompanying drawing in which Fig. 1 is a section illustrating the device applied to a connected link and lever.

Fig. 2 is a side view of the spring collar or washer before its assembly.

Fig. 3 is a plan view of the collar or washer.

Fig. 4 is a view similar to Fig. 1, but showing a modification.

Fig. 5 is a side view of the modified spring collar disassembled.

Fig. 6 is a plan view of the collar in Fig. 5.

Fig. 7 is a view similar to Fig. 1, but showing yet another modification.

Fig. 8 is an end view of Fig. 7.

Fig. 9 is a plan view of the collar or washer of Fig. 7.

Fig. 10 is a sectional view showing an additional modification of the device applied to a connecting link and lever.

Fig. 11 is an end view of Fig. 10.

Fig. 12 is a sectional view of the collar shown in Fig. 10.

Fig. 13 is a plan view of the outer surface of the collar shown in Fig. 10.

Fig. 14 is an elevation view of the collar of Fig. 10.

Fig. 15 is a plan view of the inner surface of the collar of Fig. 10.

In the first form of the invention in Figs. 1-3, there is shown a link or rod 8 having its extremity 9 bent at a right angle and forming a shank projecting through a rather loosely fitting opening 10 in a lever 11. The shank 9 is slotted or undercut as at 12 forming shoulders 13 and a head portion 14. A collar or washer 15 has a centrally depressed portion 16 and a central slot 17 having an open end 18. Slot 17 in the collar is laterally received upon the undercut portion of shank 9 in the assembly, with depressed portion 16 of the collar seated against shoulders 13 on the shank. Compressed between the collar 15 and the adjacent face of lever 11 is a coiled compression spring 18a which normally maintains the collar frictionally seated against shoulders 13. However, in order to prevent inadvertent release of the collar and, consequently the spring, as under the influence of vibration, the collar is provided with a pair of upstanding tangs 19 which, in the assembly, are bent around the end 14 of the shank so as to grip the head portion thereof. These tangs prevent axial movement of the collar as is necessary to withdraw the same from the shank. This bending operation can be easily accomplished in the field. If it is desired to disassemble the anti-rattle device, it is only necessary to straighten tangs 19, compress spring 18a and then withdraw the collar laterally from the shank.

In the modified form in Figs. 4-6, shank extension 9 is formed the same as in Figure 1. Spring seat collar 20 has turned over edge 21 and a central slot 22 with a normally open side 23. A pair of tangs 24 are formed adjacent the open end of the slot. The height of these tangs is less than the axial dimension of slot 12 in the shank so that, after coiled spring 18 is applied and compressed, the collar may be inserted from the side to the under-cut extremity of the shank. Thereafter, tangs 24 are gripped by the tool and the body of the collar is bent about the shank, as in Fig. 4 until the tangs come together to prevent inadvertent release of the collar and spring. To disassemble the device, it is only necessary to separate tangs 24 to the position in Figs. 5 and 6 and then compress spring 18, whereupon, the collar may be withdrawn sidewardly from slots 12 in the shank.

In Figs. 7, 8 and 9 the spring seat washer 25 is provided with a central slot 26 with closed ends. At 90° to this slot the metal of the washer is depressed to form a pair of aligned depressions 27. At the ends of slot 26 there are provided tangs 28 which are formed upstanding. In assembling the washer with a link after spring 18a is applied and slot 26 is inserted over the elongated head 14 of the link shank 9 until depressions 27 on the washer lie abreast of undercut portion 12 of the shank. The washer is then turned 90°, as shown in Fig. 8, and released, whereupon, depressions 27 lodge beneath head 14 on the link shank so that the head seats in the oblong depression above the shoulders. This depression prevents the rotation of the washer. Tangs 28 are then bent over so as to lie upon and across head 14 and thereby prevent unauthorized movement of the washer inwardly of the shank. Figs. 7 and 8 show one of the tangs bent over and the other upstanding.

The depressions and the tang 28 cooperate respectively, to prevent disassembly of the washer from the shank. In case it is desired to remove the washer and spring, it is only necessary to bend up tangs 28, then depress and rotate the washer.

In Figs. 10-15, the modified spring seat washer 30 is formed with a turned over edge 31, out of which are formed a pair of diametrically opposite tangs 32. At 90° to the diameter joining the tangs washer 30 is provided with a central slot 33 with closed ends. The metal of the washer is depressed between the tangs to form a pair of aligned depressions 34 normal to and on opposite sides of slot 33. To assemble the washer with a link, spring 18a is applied to the link shank 9 and the elongated head 14 of the link shank is inserted into slot 32 of the washer until depressions 34 of the washer lie abreast of undercut portion 12 of the shank. The washer is then rotated 90°, to the position best illustrated in Fig. 11, and released, so that spring 18a urges depressions 34 into registry with the shoulders 13 of shank 9. This prevents undesired rotation of the washer. Tangs 32 are then bent over so as to lie upon and across head 14 and thereby prevent unauthorized movement of the washer inwardly of the shank. Thus, undesired disassembly of the washer from the shank is prevented by cooperation of the depressions and the tangs. Disassembly is readily effected by bending up the tangs and depressing and rotating the washer.

The device illustrated effectively avoids rattling between the link and lever and also reduces wear. Moreover, it may be readily assembled and disassembled, yet, cannot be inadvertently released as the result of vibration. Broadly, shoulder 13 may be formed otherwise than by slotting the shaft and the shaft may extend beyond head 14. In the claims, the word "shaft" refers to a member, such as 9, whether a bolt, stud, link, or the like.

The invention may be modified in various respects as will occur to those skilled in the art and the exclusive use of all modifications as come within the scope of the appended claims is contemplated.

We claim:

1. An anti-rattle fastener device comprising a shaft having an undercut end portion forming an axially facing shoulder, said end portion being non-circular in circumference, a collar having a slot for reception over said non-circular end portion and its marginal edges flanged inwardly to provide a spring receiving cup, said collar being formed with an outwardly facing recess at its internal portion and said recess being disaligned from said slot for closely fitting under and around said shoulder to prevent rotational movement between the parts when the shoulder is seated in said recess, a spring on said shaft having one end positioned in said spring receiving cup for urging said collar against said shoulder, and a pair of tangs projecting from the end walls of said slot and extending across the shaft end to prevent inward movement of said collar on said shaft.

2. An anti-rattle fastener device comprising a shaft having an undercut end portion forming an axially facing shoulder, said end portion being non-circular in circumference, a collar having a slot for reception over said non-circular end portion and its marginal edges flanged inwardly to provide a spring receiving cup, said collar being formed with an outwardly facing recess at its internal portion and said recess being disaligned from said slot for closely fitting under and around said shoulder to prevent rotational movement between the parts when the shoulder is seated in said recess, a spring on said shaft having one end positioned in said spring receiving cup for urging said collar against said shoulder, and a pair of tangs projecting from said collar and extending across the shaft end to prevent inward movement of said collar on said shaft.

References Cited in the file of this patent

UNITED STATES PATENTS

| Number | Name | Date |
| --- | --- | --- |
| 691,765 | Hayes | Jan. 28, 1902 |
| 1,194,426 | Richey | Aug. 15, 1916 |
| 1,262,370 | Mead | Apr. 9, 1918 |
| 1,265,869 | Arkin | May 14, 1918 |
| 1,427,807 | Halbleib | Sept. 5, 1922 |
| 1,555,439 | Schulze | Sept. 29, 1925 |
| 1,587,224 | Funnell | June 1, 1926 |
| 2,149,435 | Habach | Mar. 7, 1939 |
| 2,237,465 | Zimmerman | Apr. 8, 1941 |
| 2,410,832 | McLean | Nov. 12, 1946 |